United States Patent Office 3,244,726

Patented Apr. 5, 1966

3,244,726

N-ACETONYL-2,4-DINITROPYRROLE

George Karmas, Bound Brook, N.J., assignor to Ortho Pharmaceutical Corporation, a corporation of New Jersey

No Drawing. Original application Nov. 5, 1964, Ser. No. 409,277. Divided and this application Sept. 7, 1965, Ser. No. 485,551

1 Claim. (Cl. 260—326.5)

This is a division of application Serial No. 409,277, filed November 5, 1964, which is a continuation-in-part of my co-pending application Serial No. 23,383, filed April 20, 1960 (now abandoned), and application Serial No. 210,199, filed July 16, 1962, now abandoned.

The present invention relates to 1-substituted-2,4-dinitropyrroles. Specifically, the new compounds may be represented by the following structural formula

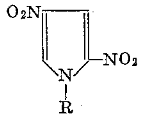

in which R is a substituent selected from the group consisting of alkyl groups selected from the group consisting of n-propyl, n-butyl, iso-butyl, sec-butyl, n-amyl, isopentyl, sec-pentyl and n-hexyl, haloalkyl groups selected from the group consisting of $\gamma$-bromopropyl and $\delta$-bromobutyl, acetonyl, $\beta,\gamma$-dihydroxypropyl, $\beta,\gamma$-diacetoxypropyl, 1-(N-morpholino carbonyl methyl), piperazino groups selected from the group consisting of 1-($N_4$-methyl-$N_1$-piperazino carbonyl methyl and 1-($N_4$-acetyl-$N_1$-piperazino carbonyl methyl, and 1-(2-methyl-5-nitroimidazolyl-1-ethyl).

Examples of 2,4-dinitropyrroles coming within the scope of the above formula are: 1-($\gamma$-bromopropyl)-2,4-dinitropyrrole, 1-acetonyl-2,4-dinitropyrrole, 1-isopentyl-2,4-dinitropyrrole, 1 - ($\beta,\gamma$-dihydroxypropyl)-2,4-dinitropyrrole and 1-(N-morpholino carbonyl methyl)-2,4-dinitropyrrole.

The compounds of the present invention have antimicrobial activity and more specifically are effective against *Trichomonas foetus,* a parasitic protozoan that infects the uterus of animals and causes abortion in cattle. The high order of trichomonodicidal activity possessed by the compounds of the present invention is quite surprising as the closely related 1-alkyl-2,5-dinitropyrroles and 1-alkyl-3,4-dinitropyrroles have no useful activity.

It is an object of the present invention to provide new compounds having therapeutic utility in the treatment of animals infected with *Trichomonas foetus.*

It is also an object of this invention to provide a new method for the preparation of 1-substituted 2,4-dinitropyrroles.

Heretofore it has been proposed to prepare N-alkylpyrroles by reacting pyrrole with potassium metal in an organic solvent such as a low boiling hydrocarbon and reacting the resulting N-potassiumpyrrole with an alkyl halide for example, methyl iodide. The latter reaction is carried out either by heating the ingredients together in a sealed tube at 120–130° C., or by refluxing in a low boiling organic solvent. By this method, N-methylpyrrole can be obtained in yields around 25–50%. A considerable amount of pyrrole is converted to $\alpha$-methylpyrrole, which side reaction is primarily responsible for the relatively low yield of the desired N-alkyl product.

It has also been proposed to react an alkali metal pyrrole in anhydrous liquid ammonia with an organic halide. Under such conditions, high yields have been obtained, but the anhydrous liquid ammonia solvent is more difficult to handle than a solvent having a lower vapor pressure. Moreover, the alkylation reaction, at liquid ammonia temperature, requires several hours for completion.

In accordance with the present invention, the alkylation of 2,4-dinitropyrroles is effected in dimethylformamide which is a superior solvent for this reaction. In general, the alkali metal salt of 2,4-dinitropyrrole and an excess of the alkylating agent, which may be a chloride, bromide, iodide sulfate, sulfonate, etc., are heated in dimethylformamide for varying periods of time (determined by the reactivity of the alkylating agent). The reaction product is isolated and purified by conventional procedures of extraction, distillation, recrystallization, etc. In those instances where the grouping introduced at the 1-position of the pyrrole contains a functional group, further reactions may be performed on this group. For example, an ester may be hydrolyzed to a carboxylic acid and the latter may further be converted to an acid chloride, from which a wide variety of derivatives may be prepared.

The following examples will serve to illustrate more fully the method of preparing the novel compounds of the present invention.

EXAMPLE I

*1-butyl-2,4-dinitropyrrole*

A mixture of 5 grams (0.0275 mole) of the sodium salt of 2,4-dinitropyrrole, 8 milliliters of dibutyl sulfate, and 20 milliliters of dimethylformamide is heated to a gentle boil and after one minute is cooled and poured with stirring into a mixture of 200 milliliters of water, 100 grams ice, and 15 grams of sodium carbonate layered with 150 milliliters of ether. This mixture is shaken vigorously and then the layers are separated. The ether solution is washed with 100 milliliters of 5% aqueous sodium carbonate, dried with anhydrous magnesium sulfate, concentrated and then distilled. The 1-butyl-2,4-dinitropyrrole is a pale yellow oil which distills at 130–135° C. at 0.2 mm.

Unalkylated 2,4-dinitropyrrole may be recovered from the aqueous sodium carbonate solutions by acidification and extraction with ether.

Dimethyl sulfate, diethyl sulfate, and dipropyl sulfate have also been reacted with the sodium salt of 2,4-dinitropyrrole following this procedure.

EXAMPLE II

*1-isoamyl-2,4-dinitropyrrole*

A mixture of 5 grams (0.0275 mole) of the sodium salt of 2,4-dinitropyrrole, 6 milliliters of isoamyl bromide, and 10 milliliters of dimethylformamide is heated under reflux for two hours. The reaction mixture is worked up as described for the 1-butyl analog (Example I), and distillation affords 1-isoamyl-2,4-dinitropyrrole as a pale yellow oil which distills at 135–140° C. at 0.1 mm.

EXAMPLE III

*1-propyl-2,4-dinitropyrrole*

A mixture of 38.6 grams (0.215 mole) of the sodium salt of 2,4-dinitropyrrole, 30 milliliters of propyl bromide and 30 milliliters of dimethylformamide is heated in a sealed tube at 135–140° C. for 3½ hours. After cooling, the tube is opened and the reaction mixture is worked up as described in Example I above. Distillation affords 24.7 grams of 1-propyl-2,4-dinitropyrrole. This solid product is recrystallized from an ether-ligroin mixture to give 20.2 grams (47.2% yield) of pale yellow prisms, melting point 56–57° C.

From the aqueous sodium carbonate solutions, a 35% recovery of 2,4-dinitropyrrole is effected an acidification with hydrochloric acid and extraction with ether.

EXAMPLE IV

*1-(2,3-dihydroxypropyl)-2,4-dinitropyrrole*

A mixture of 5 grams (0.0275 mole) of the sodium salt of 2,4-dinitropyrrole, 6 milliliters of α-glyceryl monochorohydrin, and 20 milliliters of dimethylformamide is heated under reflux for fifty minutes, cooled slightly, and then cencentrated under vacuum to remove the solvent. The viscous concentration residue is leached with three 300-milliliter portions of boiling ether, decanting each time from the insoluble residue. The combined ether solution is concentrated and the oily residue is distilled to afford the crude product as a viscous oil which boils at 200–210° C., at 0.01–0.02 mm. It solidifies on standing and is recrystallized from ethyl acetate to give 2.4 grams (37.8% yield) of 1-(2,3-dihydroxypropyl)2,4-dinitropyrrole, small cream prisms of melting point 111–112° C.

This procedure is generally suitable for the preparation of water soluble 1-substituted-2,4-dinitropyrroles because it avoids the loss of these in aqueous wash solutions. It has been applied to the synthesis of the corresponding 1-(β-hydroxyethyl) and 1-(γ-hydroxypropyl) analogs.

EXAMPLE V

*1-(β,γ-diacetoxypropyl)-2,4-dinitropyrrole*

A mixture of 7.3 grams of 1-(β,γ-dihydroxypropyl)-2,4-dinitropyrrole (Example IV) and 60 milliliters of acetic anhydride is treated under reflux for ninety minutes, cooled slightly, and then concentrated under vacuum to remove the excess of acetic anhydride. The syrupy residue is dissolved in 20 milliliters of boiling ethyl acetate and the solution is stored at 0° to crystallize 8.4 grams of pale yellow granules which melt at 109–110°. A second crop of 1.0 gram is isolated by concentration of the mother liquor. The total of 9.4 grams represents a yield of 94%.

EXAMPLE VI

*1-carboxymethyl-2,4-dinitropyrrole*

To a cold (5° C.) solution of 5.2 grams (0.0214 mole) of 1-carbethoxymethyl-2,4-dinitropyrrole (prepared according to the process of Example II, from ethyl chloroacetate) in 150 milliliters of methanol is added 0.855 gram (0.0214 mole) of sodium hydroxide in 10 milliliters of water. To the resulting paste is added 200 milliliters of water and this mixture is warmed at 45° C. for 10 minutes. After it has been cooled to 0° C., this solution is acidified with hydrochloric acid and the precipitated carboxylic acid is filtered off, washed on the filter with cold water, and dried in air. The 1-carboxymethyl-2,4-dinitropyrrole thus isolated, in almost quantitative yield, is hydrated. It melts at 205–207° C., after slow loss of water of hydration on the melting point stage.

Calcd. for $C_6H_5O_6N_3$: C, 33.50; H, 2.34. Found: C, 33.63; H, 2.60.

EXAMPLE VII

*1-(4-methylpiperazinocarbonylmethyl)-2,4-dinitropyrrole*

A mixture of 10 grams of 1-carboxymethyl-2,4-dinitropyrrole (Example VI) and 75 milliliters of thionyl chloride is boiled under reflux for two hours and then concentrated under vacuum at 60° C. The dark oily residue is dissolved in 50 milliliters of toluene and reconcentrated under vacuum at 60° C. The residue is dissolved in 100 milliliters of methylene chloride and this solution is stirred at 0° while a solution of 5 grams of N-methylpiperazine in 40 milliliters of methylene chloride is added over ten minutes. After being allowed to stand at 25° for fifteen hours, the reaction mixture is shaken with 20 milliliters of 10% aqueous sodium carbonate and the methylene chloride layer is separated and dried with magnesium sulfate and then concentrated to a solid residue. This is recrystallized from ethyl acetate to afford 8.4 grams (61%) of 1-(4-methylpiperazino-carbonylmethyl)-2,4-dinitropyrrole as buff flakes which melt at 120–121°.

EXAMPLE VIII

*1-(N-pyrrolidocarbonylmethyl)-2,4-dinitropyrrole*

A mixture of 10 grams of the sodium salt of 2,4-dinitropyrrole, 9.4 grams of N-chloroacetyl-pyrrolidine, and 40 milliliters of dimethylformamide is boiled under reflux for fifteen minutes and then poured into 600 milliliters of cold 5% aqueous potassium carbonate. The insoluble solid is filtered off, dried in air and decolorized with charcoal in an acetone solution. The clear filtrate is evaporated to dryness and the solid residue is recrystallized from ethyl acetate to afford 12 grams (80%) of 1-(N-pyrrolidinocarbonylmethyl)-2,4-dinitropyrrole as pale yellow prisms which melt at 158–159°.

EXAMPLE IX

*1-(β-bromoethyl)-2-methyl-5-nitroimidazole*

Fifty milliliters of thionyl bromide is stirred vigorously and maintained at 50–60° while a total of 47.5 g. of 1-(β-hydroxyethyl)-2-methyl-5-nitroimidazole is added over a period of fifteen minutes. The reaction mixture is then maintained at 80–85° for fifteen minutes, cooled slightly, and poured onto ice, the last of the contents being rinsed from the reaction vessel with methylene chloride and a little water. Three hundred milliliters of methylene chloride is added to the hydrolysis mixture which is then stirred and maintained at 5° while enough solid potassium carbonate is added to attain a permanent slightly alkaline pH. The mixture is now filtered and the layers of the filtrate are separated. The methylene chloride portion is dried with magnesium sulfate and concentrated under vacuum to a solid yellow residue which weighs 62.8 grams (96%). This crude β-bromoethyl compound is suitable for condensation with the potassium salt of 2,4-dinitropyrrole.

Pale yellow granules which melt at 81–82° may be obtained by recrystallization from ether.

EXAMPLE X

*1-[(2,4-dinitropyrryl-1)ethyl]-2-methyl-5-nitroimidazole*

A mixture of 17 grams of the potassium salt of 2,4-dinitropyrrole, 20 grams of 1-(β-bromoethyl)-2-methyl-5-nitroimidazole, and 70 milliliters of dimethylformamide is stirred and boiled under reflux for fifteen minutes and then poured into one liter of cold 5% aqueous potassium carbonate. The insoluble solid is filtered off, dried in air and decolorized with charcoal in an acetone solution. The pale orange acetone filtrate (about 600 milliliters in volume) is boiled down to a volume of 150 milliliters and chilled at 0° to effect crystallization of 16.4 grams of 1-[2,4-dinitropyrryl-1)ethyl]-2-methyl-5-nitroimidazole, yellow granules which melt at 186–187°.

A second crop of 2.1 grams is obtained on further concentration and chilling of the mother liquor, bringing the total to 18.5 grams, a yield of 70%.

The experimental details and physical contents of other compounds of the present invention prepared according to the methods illustrated in Examples I through X above, appear in Tables I, II and III. The constants of compounds not listed in Table III may be found in the detailed Examples I through X.

TABLE I.—1-ALKYL-2,4-DINITROPYRROLES, FROM DIALKYL SULFATES

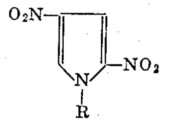

| R | Reaction conditions (in dimethylformamide) | Yield, percent |
|---|---|---|
| n-$C_3H_7$ | 1 min. at 145° | 45 |
| n-$C_4H_9$ | do | 83 |

TABLE II.—1-ALKYL-2,4-DINITROPYRROLES, FROM ALKYL HALIDES

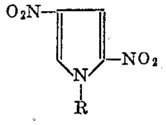

| R | Alkylating agent | Reaction conditions (in dimethylformamide) | Yield, percent |
|---|---|---|---|
| n-$C_3H_7$ | n-$C_3H_7Br$ | 3½ hrs. at 135° | 47 |
| iso-$C_4H_9$ | iso-$C_4H_9Br$ | 1 hr. at 145° | 64 |
| sec-$C_4H_9$ | sec-$C_4H_9Br$ | 1½ hrs. at 140° | 30 |
| n-$C_5H_{11}$ | n-$C_5H_{11}Br$ | ½ hr. at 120° | 77 |
| iso-$C_5H_{11}$ | iso-$C_5H_{11}Br$ | ½ hr. at 140° | 74 |
| sec-$C_5H_{11}$ | sec-$C_5H_{11}Br$ | ¾ hr. at 140° | 28 |
| n-$C_6H_{13}$ | n-$C_6H_{13}Br$ | 2 hrs. at 130° | 74 |
| $CH_2CH_2CH_2Br$ | $BrCH_2CH_2CH_2Br$ | 20 min. at 150° | 54 |
| $CH_2COCH_3$ | $CH_3COCH_2Cl$ | 5 min. at 140° | 78 |
| $CH_2CHOHCH_2OH$ | $CH_2OHCHOHCH_2Cl$ | 50 min. at 145° | 39 |
| $CH_2CH_2CH_2CH_2Br$ | $BrCH_2CH_2CH_2CH_2Br$ | 10 min. at 145° | 66 |
| 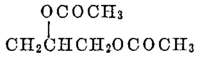 | (Note 1) | (Note 2) | 94 |
| 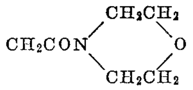 | 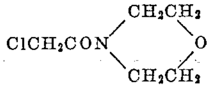 | 15 min. at 150° | 75 |
| 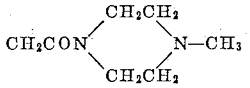 | (Note 3) | (Note 4) | 61 |
| 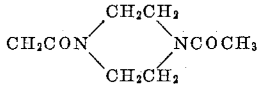 | (Note 5) | (Note 6) | 25 |
| 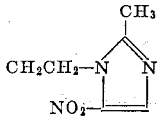 | 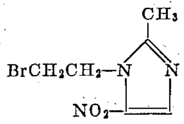 | 15 min. at 150° | 70 |

NOTE 1.—By acetylation of $R=CH_2CHOHCH_2OH$.

NOTE 2.—1½ hours at 140° in excess acetic anhydride.

NOTE 3.—By reaction of $R=CH_2COCl$ with 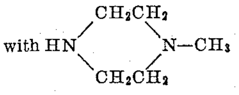

NOTE 4.—20 hours at 25° in methylene chloride.

NOTE 5.—By reaction of $R=CH_2COCl$ with 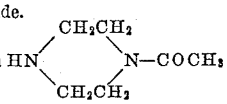

NOTE 6.—½ hour at 5° in methylene chloride.

TABLE III.—PHYSICAL CONSTANTS OF 1-ALKYL-2,4-DINITROPYRROLES OF TABLES I AND II

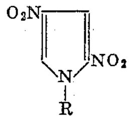

| R | B.P. °C./mm. | M.P. | Analytical | |
|---|---|---|---|---|
| | | | Calcd. | Found |
| n-$C_3H_7$ | 125–130°/.2 | 56–57° | 42.21 C; 4.55 H | 42.26 C; 4.65 H. |
| n-$C_4H_9$ | 130–135°/.2 | | 45.07 C; 5.20 H | 45.02 C; 5.39 H. |
| iso-$C_4H_9$ | 137–139/.4 | | 45.07 C; 5.20 H | 45.31 C; 5.18 H. |
| sec-$C_4H_9$ | 125–130°/.1 | 59–60° | 45.07 C; 5.20 H | 45.49 C; 5.27 H. |
| n-$C_5H_{11}$ | 146–148°/.2 | | 18.49 N | 18.62 N. |
| iso-$C_5H_{11}$ | 135–140°/.1 | | 47.47 C; 5.77 H | 47.65 C; 5.72 H. |
| sec-$C_5H_{11}$ | 110–115°/.005 | | 47.57 C; 5.77 H | 46.87 C; 5.75 H. |
| n-$C_6H_{13}$ | 125–130°/.002 | | 49.78 C; 6.27 H | 49.71 C; 6.15 H. |
| $CH_2CH_2CH_2Br$ | 165–170°/.01 | 67–68° | 30.43 C; 2.90 H | 30.23 C; 3.20 H. |
| $CH_2CH_2CH_2CH_2Br$ | 180–185°/.003 | 67–69° | 32.88 C; 3.45 H | 33.28 C; 3.62 H. |
| $CH_2COCH_3$ | | 151–152° | 39.44 C; 3.31 H | 39.88 C; 3.35 H. |
| $CH_2CHOHCH_2OH$ | 200–210°/.02 | 111–112° | 36.37 C; 3.92 H | 36.16 C; 3.93 H. |
| 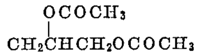 | | 109–110° | 41.91 C; 4.16 H | 42.16 C; 4.00 H. |

TABLE III.—*Continued*

| R | B.P.°C./mm. | M.P. | Analytical | |
|---|---|---|---|---|
| | | | Calcd. | Found |
| 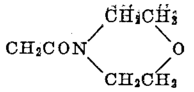 | -------------- | 145–146°--- | 42.25 C; 4.26 H---- | 41.91 C; 4.15 H. |
| 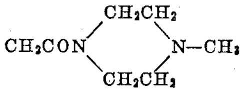 | -------------- | 120–121°--- | 44.44 C; 5.00 H---- | 44.48 C; 5.16 H. |
| 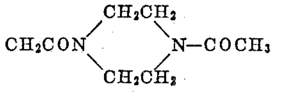 | -------------- | 215–216°--- | 44.31 C; 4.65 H---- | 44.09 C; 4.68 H. |
| 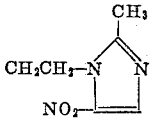 | -------------- | 186–187°--- | 38.71 C; 3.25 H---- | 39.09 C; 3.19 H. |

The in vitro trichomonadicidal activity of the compounds of the present invention may be demonstrated by a series of tests which establishes the minimal inhibitory concentration of these compounds. Minimal inhibitory concentration, as used above, is defined as the minimal concentration of a trichomonadicidal compound capable of preventing the growth of and killing *Trichomonas foetus* organisms introduced into a culture medium, capable alone of supporting a vigorous growth of the organisms and containing the trichomonadicidal compound to be tested. The culture medium used in the tests is described in a publication of Kupferberg, Johnson and Sprince, Proceedings of the Society for Experimental Biology and Medicine, volume 67, pages 304–308, 1948.

In making the tests to determine minimal inhibitory concentrations, 0.05 milliliter of a 48-hour culture of *Trichomonas foetus* is placed in a series of tubes containing 10 milliliters of the culture medium and increasing amounts of the compound to be tested. The inoculated culture medium is then incubated at 37° C. for nine days and examined under magnification after two, five, seven, and nine days. The minimal inhibitory concentration of the compound tested is that concentration in the tube in which no viable organisms are present at the ninth day examination. If there are no viable organisms present on examination at a time less than nine days, the concentration of compound is greater than minimal and if there are viable organisms present at the ninth day examination, the concentration is less than minimal. The results of these tests appear in column 1 of Table IV, wherein the concentration of the 1-substituted-2,4-dinitropyrroles is expressed in parts per million.

The toxicity of the compounds of the present invention are determined by oral administration to mice and may be determined from the in vivo data appearing in Table IV. In column 2, under the heading $LD_{50}$, is indicated the quantity (in milligrams per kilogram of body weight) which is fatal to 50% of the mice tested. The amount (in milligrams per kilogram of body weight) required to cure 50% of the test animals injected with a lethal dose of *Trichomonas foetus* is indicated in column 3, under the heading $PD_{50}$. In this column, "N.P" indicates no protection. Column 4 of Table IV reports the therapeutic index of these compounds. A therapeutic index of at least 10 is preferred by pharmacologists as providing a sufficient margin of safety between the $LD_{50}$ and the $PD_{50}$.

TABLE IV.—TRICHOMONADICIDAL ACTIVITY OF 1-SUBSTITUTED-2,4-DINITROPYRROLES

| R | In vitro activity, p.p.m. | In vivo | | |
|---|---|---|---|---|
| | | $LD_{50}$ | $PD_{50}$ | T.I. |
| n-$C_3H_7$ | >100 | 900 | 30 | 30.0 |
| n-$C_4H_9$ | 100.0 | 1,200 | 53 | 23.0 |
| iso-$C_4H_9$ | 10.0 | 1,000 | <84 | >12.0 |
| sec-$C_4H_9$ | 10.0 | 1,200–1,250 | 45 | 33.0 |
| n-$C_5H_{11}$ | 20.0 | 1,500 | 50 | 30 |
| iso-$C_5H_{11}$ | >100 | 1,100 | 5.3 | 200.0 |
| sec-$C_5H_{11}$ | 20.0 | >2,150 | 100 | >21.5 |
| n-$C_6H_{13}$ | 10.0 | >2,150 | 140–150 | >14.3 |
| $CH_2CH_2CH_2Br$ | 10.0 | 1,400 | 120 | 12.0 |
| $CH_2CH_2CH_2CH_2Br$ | 0.4 | 1,000–2,000 | 75–100 | 10–20 |
| $CH_2COCH_3$ | 10.0 | 1,000 | 37.5 | 27.0 |
| $CH_2CHOHCH_2OH$ | 2.0 | 1,050 | 15–20 | 52.0 |
| 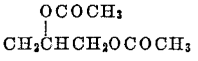 | 10.0 | >1,900 | 25–30 | >76 |
| 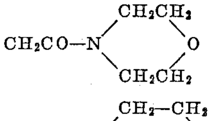 | 1.0 | 1,500 | 5–7 | >200 |
| 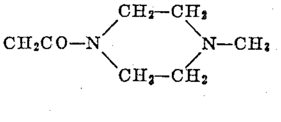 | 10.0 | 1,050 | 10.5 | 100 |

TABLE IV.—*Continued*

| R | In vitro activity, p.p.m. | In vivo | | |
|---|---|---|---|---|
| | | $LD_{50}$ | $PD_{50}$ | T.I. |
| 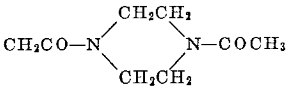 | 10.0 | >1,050 | 67–135 | >10.5 |
| 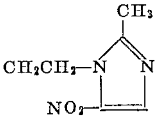 | (Inactive) | >3,000 | 10.5 | >300 |

In employing the trichomonadicides of the present invention for the treatment of *Trichomonas foetus,* one or more of the active agents are uniformly distributed in a suitable chemotherapeutic vehicle that is chemically compatible with the particular trichomonadicide selected, non-inhibiting with respect to the action of the effective agent upon *Trichomonas foetus* and essentially non-injurious to the vaginal mucosa under the conditions of use. The vehicle is preferably of a liquid or semi-liquid type. Furthermore, since the final preparation should be readily miscible with vaginal fluids, the vehicles, whether hydrous or anhydrous, are preferably water-miscible or water-dispersible. The compositions of this invention may be in the form of suppositories, if desired.

The foregoing criteria for a vehicle in which the compounds of the present invention are incorporated may be met by a large number of semi-liquid chemotherapeutic vehicles that are well known in the art. Thus, for example, the vehicle may comprise semi-liquids that are colloidal in nature, especially those that are viscous and/or mucilaginous in character. Such vehicles are particularly suitable for use in topical treatment of *Trichomonas foetus* because of their inherent gelatinous and miscible nature which affords prolonged contact between the 1-substituted-2,4-dinitropyrrole and the infecting organism.

In order to disclose more clearly the manner of formulating the compounds of the present invention to topical application, several specific examples will hereinafter be described in considerable detail.

EXAMPLE XI

| | |
|---|---|
| Deionized water | 75.80 |
| Sodium carboxymethylcellulose | 3.00 |
| Polyethyleneglycol (molecular weight approximately 4000) | 15.00 |
| Propylene glycol | 5.00 |
| Para-hydroxyl-benzoic acid methyl ester | 0.20 |
| 1-Methyl-2,4-dinitropyrrole | 1.00 |

EXAMPLE XIII

| | |
|---|---|
| Deionized water | 90.30 |
| Methyl cellulose | 3.50 |
| Glycerin | 5.00 |
| Para-hydroxy-benzoic acid methyl ester | 0.20 |
| 1-methyl-2,4-dinitropyrrole | 1.00 |

EXAMPLE XII

| | |
|---|---|
| Deionized water | 80.00 |
| Pectin | 8.00 |
| Propylene glycol | 10.00 |
| Para-hydroxy-benzoic acid methyl ester | 0.10 |
| Para-hydroxy-benzoic acid propyl ester | 0.10 |
| 1-(δ-hydroxybutyl)-2,4-dinitropyrrole | 1.00 |

The trichomonodicidal formulations of Examples XI through XIII are prepared according to the following general procedure in which two initial solutions are mixed to make the formulation, all the parts being given by weight. To prepare Solution A, dissolve the para-hydroxy-benzoic acid methyl ester in about two-thirds of the hot deionized water, cool to about 170° F., and, while stirring, add the gel-forming ingredient and glycerine or propylene glycol. To prepare Solution B, add the trichomonadicidal agent to the remainder of the deionized water, and adjust the pH to the desired value. The formulation is prepared by adding Solution B to Solution A in a slow stream with good stirring; stirring is continued for at least one hour.

Certain compounds of the present invention have also been found to be effective against enterohepatitis (blackhead) when administered by admixture, suspension, or dispersion in the food and/or drink normally partaken by turkeys, such as grain, mash, scratch, water or other liquids.

The general range of concentration of the 1-substituted-2,4-dinitropyrrole in the total substance is from about 0.05% or less to about 1%. The optimal concentration for effective therapy is in the range from about 0.05% to about 0.2% of the total food or drinking water. With these optimal concentrations, the daily drug intake for infected birds varies from about 20 milligrams of drug per kilogram of body weight to about 400 milligrams of drug per kilgram of body weight. In general, the precise dosage depends on the particular compounds and the severity of the infection. Many of the compounds of the present invention may be administered in the concentrations indicated above with little or no toxic effect.

Various changes and modifications of the invention may be made and to the extent that such variations incorporate the spirit of this invention, they are intended to be included within the scope of the appended claims.

What is claimed is:

A compound of the formula

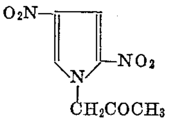

No references cited.

HENRY R. JILES, *Acting Primary Examiner.*